United States Patent
Liu et al.

(10) Patent No.: US 11,070,541 B2
(45) Date of Patent: Jul. 20, 2021

(54) CERTIFICATE MANAGEMENT METHOD AND APPARATUS IN NETWORK FUNCTIONS VIRTUALIZATION ARCHITECTURE

(71) Applicant: Huawei Technologies Co., Ltd., Guangdong (CN)

(72) Inventors: Wenji Liu, Shenzhen (CN); Jiangsheng Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 603 days.

(21) Appl. No.: 15/958,465

(22) Filed: Apr. 20, 2018

(65) Prior Publication Data
US 2018/0248867 A1    Aug. 30, 2018

Related U.S. Application Data

(63) Continuation of application No. PCT/CN2015/092386, filed on Oct. 21, 2015.

(51) Int. Cl.
*H04L 29/06* (2006.01)
*G06F 9/455* (2018.01)
(Continued)

(52) U.S. Cl.
CPC ...... *H04L 63/0823* (2013.01); *G06F 9/45558* (2013.01); *H04L 9/3268* (2013.01);
(Continued)

(58) Field of Classification Search
CPC ... H04L 63/0823; H04L 9/3268; H04L 29/06; H04L 41/0893; H04L 9/3263;
(Continued)

(56) References Cited

U.S. PATENT DOCUMENTS

2002/0112157 A1* 8/2002 Doyle ............ H04L 63/0823
713/157
2008/0065778 A1   3/2008 Deishi
(Continued)

FOREIGN PATENT DOCUMENTS

CN          1799240 A    7/2006
CN        101572707 A   11/2009
(Continued)

OTHER PUBLICATIONS

Machine Translation and Abstract of Chinese Publication No. CN101572707, dated Nov. 4, 2009, 29 pages.
(Continued)

*Primary Examiner* — Trong H Nguyen
(74) *Attorney, Agent, or Firm* — Conley Rose, P.C.

(57) ABSTRACT

Embodiments of the present application provide a certificate management method and apparatus in an NFV architecture. The certificate management method includes: determining, by an MANO, a storage network element, where the storage network element is configured to store a certificate of a VNFC, and the storage network element is different from the VNFC; creating, by the MANO, storage space in the storage network element, where the storage space is used to store the certificate of the VNFC; and sending, by the MANO, an address of the storage space to the VNFC, so that the VNFC accesses the address of the storage space, obtains the certificate of the VNFC, and directly communicates with another network element by using the certificate stored in the storage network element. The VNFC does not locally store the certificate.

20 Claims, 6 Drawing Sheets

(51) Int. Cl.
*H04L 9/32* (2006.01)
*H04L 12/24* (2006.01)

(52) U.S. Cl.
CPC .......... *H04L 29/06* (2013.01); *H04L 41/0893* (2013.01); *G06F 2009/45595* (2013.01)

(58) Field of Classification Search
CPC ......... H04L 41/28; G06F 9/455–45558; G06F 2009/45562–45595; G06F 9/45558; G06F 2009/45595
See application file for complete search history.

(56) References Cited

U.S. PATENT DOCUMENTS

| | | | |
|---|---|---|---|
| 2009/0239503 A1* | 9/2009 | Smeets | H04W 12/04 455/411 |
| 2009/0282262 A1* | 11/2009 | Nonoyama | H04L 9/0825 713/189 |
| 2009/0300607 A1 | 12/2009 | Ferris et al. | |
| 2010/0005319 A1 | 1/2010 | Pohm | |
| 2011/0271115 A1 | 11/2011 | Adams et al. | |
| 2012/0054486 A1* | 3/2012 | Lakkavalli | G06F 21/57 713/156 |
| 2014/0052877 A1* | 2/2014 | Mao | H04L 12/4641 709/245 |
| 2014/0189847 A1* | 7/2014 | Shen | H04L 63/0272 726/15 |
| 2014/0281503 A1* | 9/2014 | Mills | H04L 63/0823 713/157 |
| 2015/0063166 A1 | 3/2015 | Sif et al. | |
| 2015/0254451 A1 | 9/2015 | Doane et al. | |
| 2016/0094546 A1* | 3/2016 | Innes | H04L 63/0815 713/156 |
| 2017/0012968 A1 | 1/2017 | Feng et al. | |
| 2017/0054565 A1 | 2/2017 | Feng et al. | |
| 2017/0300352 A1 | 10/2017 | Lou et al. | |
| 2017/0302646 A1 | 10/2017 | Wang et al. | |
| 2018/0102904 A1 | 4/2018 | Lin et al. | |

FOREIGN PATENT DOCUMENTS

| | | |
|---|---|---|
| CN | 103257934 A | 8/2013 |
| CN | 104580208 A | 4/2015 |
| CN | 104636184 A | 5/2015 |
| CN | 104980438 A | 10/2015 |
| EP | 2782291 A1 | 9/2014 |
| KR | 20050014394 A | 2/2005 |
| KR | 20140096594 A | 8/2014 |
| WO | 2014176105 A1 | 10/2014 |
| WO | 2015135611 A1 | 9/2015 |
| WO | 2015143651 A1 | 10/2015 |
| WO | 2015168913 A1 | 11/2015 |

OTHER PUBLICATIONS

ETSI GS NFV-MAN 001 V1.1.1, Network Functions Virtualisation (NFV); Management and Orchestration, Dec. 2014, 184 pages.
Machine Translation and Abstract of Korean Publication No. KR20050014394, dated Feb. 7, 2005, 28 pages.
Machine Translation and Abstract of Korean Publication No. KR20140096594, dated Aug. 6, 2014, 12 pages.
Foreign Communication From a Counterpart Application, Korean Application No. 10-2018-7012832, Korean Notice of Preliminary Rejection dated May 22, 2019, 10 pages.
Foreign Communication From a Counterpart Application, Korean Application No. 10-2018-7012832, English Translation of Korean Notice of Preliminary Rejection dated May 22, 2019, 8 pages.
Machine Translation and Abstract of Chinese Publication No. CN103257934, dated Aug. 21, 2013, 32 pages.
Foreign Communication From a Counterpart Application, Chinese Application No. 2015800304777, Chinese Search Report dated Oct. 17, 2019, 2 pages.
Foreign Communication From a Counterpart Application, Chinese Application No. 2015800304777, Chinese Office Action dated Oct. 28, 2019, 3 pages.
"Network Functions Virtualisation (NFV); NFV Security; Certificate Management Guidance"; ETSI GS NFV-SEC 005 V0.0.6; Sep. 2015; 27 pages.

\* cited by examiner

200

An NFV management and orchestration system MANO determines a storage network element, the storage network element is configured to store a certificate of a virtualized network function component VNFC, and the storage network element is different from the VNFC ~ 210

The MANO creates storage space in the storage network element, and the storage space is used to store the certificate of the VNFC ~ 220

The MANO sends an address of the storage space to the VNFC ~ 230

A virtualized network function component VNFC receives an address of storage space that is sent by an NFV management and orchestration system MANO, the storage space is used to store a certificate of the VNFC, the storage space is located in a storage network element, and the storage network element is different from the VNFC ~ 310

The VNFC obtains the certificate of the VNFC by accessing the address of the storage space ~ 320

FIG. 3

CERTIFICATE MANAGEMENT METHOD AND APPARATUS IN NETWORK FUNCTIONS VIRTUALIZATION ARCHITECTURE

CROSS-REFERENCE TO RELATED APPLICATIONS

This application is a continuation of International Application No. PCT/CN2015/092386 filed on Oct. 21, 2015, the disclosure of which is hereby incorporated by reference in its entirety.

TECHNICAL FIELD

The present application relates to the field of network functions virtualization, and in particular, to a certificate management method and apparatus in a network functions virtualization NFV architecture.

BACKGROUND

With commodity hardware such as x86 and virtualization technologies, network functions virtualization (NFV) enables a network device function to no longer be dependent on dedicated hardware, and a resource to be fully and flexibly shared. The NFV implements rapid development and deployment of a new service, and implements automatic deployment, elastic scaling, fault isolation, self-healing, and the like based on an actual service requirement.

The European Telecommunications Standards Institute (ETSI) founded the NFV Industry Standard Group (ISG) in October 2012. The NFV ISG aims to define a network function virtualization requirement of an operator and a related technical report, and expects to implement some network functions in a general high-performance server, switch, and storage with reference to an IT virtualization technology. An NFV architecture and a basic procedure specified by the NFV ISG are already used as standards in the industry, and are implemented in each telecommunications cloudification project. A final objective of the NFV is to replace a private and dedicated network element device in a communications network by using an industry-standard-based X86 server, storage, and switching device. Network functions need to be implemented in a manner of software, be capable of running in general-purpose server hardware, and be capable of being migrated, instantiated, and deployed in different locations of a network according to a requirement without a need to install a new device. An X86-standard-based IT device of the NFV has a low cost, and therefore can save huge investment costs for operators. In addition, an open API of the NFV can help the operator obtain more flexible and more network capabilities, thereby changing operation of a network.

In the NFV architecture, a virtualized network function (VNF) is introduced, and this brings a relatively great change to architectures of a conventional network and a conventional network node. In a new telecommunications architecture, a conventional network node evolves into a virtual node, and exists in a form of a virtual machine. In this way, multiple conventional network nodes are deployed on a same physical host machine, share a hardware resource, and even share a resource with other third-party application software. In addition, for ease of dynamic virtual machine migration and communication performance improvement between virtual machines in a same virtualizer, a conventional IP network evolves into a virtual network by using a virtual switch and a virtual network adapter. Virtual machines directly communicate with each other by using the virtual network, and a conventional physical network device is bypassed. However, with virtualization, communication between internal virtual machines in the virtual network and communication between a virtual machine and an external network are confronted with security risks, for example, mutual attacks between virtual machines, an attack from a host machine application against a host, an attack from a host machine application against a system management program (hypervisor), an attack from a host machine application against a virtual machine, an attack from a host machine application by means of interoperability with a virtual machine network, an attack from a host machine application against a virtual machine by using a remote maintenance management channel, and an attack from a host machine application against an external network by using a network edge node. With these communication threats confronted by the virtualization, virtualized communication is required to use a specific security technology, such as the Internet Protocol Security (IPSec), and the Transport Layer Security (TLS). A security connection is established, to ensure confidentiality and integrity of the communication. However, a certificate that is based on a related protocol (such as X.509) needs to be configured on both communication entity parties to establish the security connection.

In the prior art, a certificate or verification material of a VNF is usually stored in a virtualized network function component (VNFC), and the VNFC is responsible for managing the certificate or verification material. When the VNFC is updated or the certificate is updated, another VNFC belongs to a same VNF needs to re-obtain a certificate or verification material from the VNFC and update a local storage of the another VNFC. Because both the VNF and the VNFC are dynamically generated or changed according to a requirement in a manner of software, the VNFC needs to frequently obtain the certificate or verification material. In addition, if a VNFC lifecycle ends, the VNFC further needs to eliminate the certificate or verification material that is locally stored in the VNFC, and a process is tedious and complex.

Therefore, how to effectively manage a certificate in an NFV architecture becomes an urgent problem to be resolved.

SUMMARY

Embodiments of the present application provide a certificate management method and apparatus in an NFV architecture. According to the certificate management method, a certificate in the NFV architecture can be effectively managed.

According to a first aspect, a certificate management method in a network functions virtualization NFV architecture is provided, and the method includes:

determining, by an NFV management and orchestration MANO, a storage network element, where the storage network element is configured to store a certificate of a virtualized network function component VNFC, and the storage network element is different from the VNFC; creating, by the MANO, storage space in the storage network element, where the storage space is used to store the certificate of the VNFC; and sending, by the MANO, an address of the storage space to the VNFC.

In other words, the MANO creates the storage space in the storage network element of the certificate, and the storage space is used to store the certificate, so that the VNFC directly communicates with another network element by using the certificate stored in the storage network element. The VNFC does not locally store the certificate. Therefore, in this embodiment of the present application, the certificate of the VNFC is stored in the storage network element, and the VNFC does not locally store the certificate, but directly communicates with another network element by using the certificate stored in the storage network element. Because the VNFC does not locally store the certificate, operations of the VNFC such as local copying and storing, updating, and deleting the certificate are avoided, and the certificate in the NFV architecture can further be effectively managed.

With reference to the first aspect, in an implementation of the first aspect, the determining, by an NFV management and orchestration MANO, a storage network element that stores a certificate of a VNFC includes:

before the VNFC applies for a certificate or in a process in which the VNFC applies for a certificate, determining, by the MANO, the storage network element that stores the certificate of the VNFC.

It should be understood that "before the VNFC applies for a certificate or in a process in which the VNFC applies for a certificate" may indicate "in a process of VNFC instantiation or after VNFC instantiation is performed", or may indicate "in a process of VNFC capacity expansion or after VNFC capacity expansion is performed".

The VNFC instantiation and the VNFC certificate application are two different processes. The VNFC instantiation and the VNFC certificate application may be performed simultaneously, or the VNFC instantiation may be performed before the certificate application.

Similarly, the VNFC capacity expansion and the VNFC certificate application are two different processes. The VNFC capacity expansion and the VNFC certificate application may be performed simultaneously, or the VNFC capacity expansion may be performed before the certificate application.

With reference to the first aspect and the foregoing implementation of the first aspect, in another implementation of the first aspect, the sending, by the MANO, an address of the storage space to the VNFC includes: writing, by the MANO, the address of the storage space into storage and management information of the certificate; and sending, by the MANO, the storage and management information of the certificate to the VNFC.

For example, the storage and management information of the certificate is a part of VNFC instantiation parameters, and is used to indicate the address of the storage space. Therefore, after certificate application, the VNFC may obtain the certificate according to the address, and further communicate with another network element.

For example, the storage and management information of the certificate may be in a virtualized network function component descriptor VNFCD, and the MANO may send instantiation parameter information to a VIM, so that the VIM creates a virtual machine VM according to the instantiation parameters, and generates the VNFC.

With reference to the first aspect and the foregoing implementations of the first aspect, in another implementation of the first aspect, the sending, by the MANO, the storage and management information of the certificate to the VNFC includes:

in a process of simultaneously performing VNFC instantiation and VNFC certificate application, or in a process of simultaneously performing VNFC capacity expansion and VNFC certificate application, or in a process of performing VNFC certificate application after VNFC instantiation is completed, or in a process of performing VNFC certificate application after VNFC capacity expansion is performed, sending, by the MANO, the storage and management information of the certificate to the VNFC.

With reference to the first aspect and the foregoing implementations of the first aspect, in another implementation of the first aspect, the method further includes: obtaining, by the MANO, first indication information of the VNFC, where the first indication information is in an instantiation request message or a VNFCD of the VNFC, and the first indication information is used to indicate the storage network element; and the determining, by a MANO, a storage network element includes: determining, by the MANO, the storage network element according to the first indication information of the VNFC.

With reference to the first aspect and the foregoing implementations of the first aspect, in another implementation of the first aspect, the first indication information is further used to indicate a management network element of the certificate, and the management network element is configured to update the certificate or cancel management on the certificate.

With reference to the first aspect and the foregoing implementations of the first aspect, in another implementation of the first aspect, the method further includes: obtaining, by the MANO, second indication information of the VNFC, where the second indication information is in an instantiation request message or a VNFCD of the VNFC, the second indication information is used to indicate a decision network element, and the decision network element is configured to determine the storage network element of the certificate; and the determining, by a MANO, a storage network element includes: determining, by the MANO, the storage network element according to a determining result of the decision network element.

With reference to the first aspect and the foregoing implementations of the first aspect, in another implementation of the first aspect, the decision network element is further configured to determine a management network element of the certificate, and the management network element is configured to update the certificate or cancel management on the certificate.

With reference to the first aspect and the foregoing implementations of the first aspect, in another implementation of the first aspect, the determining, by an NFV management and orchestration MANO, a storage network element that stores a certificate of a VNFC includes: determining, by the MANO, the storage network element according to a management policy.

With reference to the first aspect and the foregoing implementations of the first aspect, in another implementation of the first aspect, the method further includes: determining, by the MANO, a management network element of the certificate according to the management policy, where the management network element is configured to update the certificate or cancel management on the certificate.

With reference to the first aspect and the foregoing implementations of the first aspect, in another implementation of the first aspect, the storage network element is a network functions virtualization orchestrator NFVO, a virtualized network function manager VNFM, or a virtualized infrastructure manager VIM, and the management network element is an NFVO, a VNFM, or a VIM; or the storage network element is a virtual machine VM, and the management network element is an NFVO, an NFVM, a VIM, or a master VNFC; or the storage network element is a master VNFC, and the management network element is a master VNFC.

With reference to the first aspect and the foregoing implementations of the first aspect, in another implementation of the first aspect, the certificate of the VNFC is a certificate that is obtained after the VNFC is registered with and certified by a certificate authority CA.

According to a second aspect, a certificate management method in a network functions virtualization NFV architecture is provided, and the method includes: receiving, by a VNFC, an address of storage space that is sent by an MANO, where the storage space is used to store a certificate of the VNFC, the storage space is located in a storage network element, and the storage network element is different from the VNFC; and obtaining, by the VNFC, the certificate of the VNFC by accessing the address of the storage space. The VNFC directly communicates with another network element by using the certificate, and the VNFC does not locally store the certificate. Therefore, in this embodiment of the present application, the VNFC directly obtains the certificate in the storage network element, to communicate with another network element, and the VNFC does not locally store the certificate. Because the VNFC does not locally store the certificate, operations of the VNFC such as local copying and storing, updating, and deleting the certificate are avoided, and the certificate in the NFV architecture can further be effectively managed.

With reference to the second aspect, in an implementation of the second aspect, before the receiving, by a virtualized network function component VNFC, an address of storage space that is sent by a MANO, the method further includes:

registering, by the VNFC, with a certificate authority CA and attempting to be certified by the CA, to obtain the certificate; and sending, by the VNFC, the certificate to the storage network element, so that the storage network element stores the certificate in the storage space.

With reference to the second aspect and the foregoing implementation of the second aspect, in another implementation of the second aspect, the method further includes: receiving, by the VNFC, a certificate invalidity indication message sent by a management network element; and deleting, by the VNFC according to the invalidity indication message, the address of the storage space, or setting the address of the storage space to be invalid.

According to a third aspect, an MANO in a NFV architecture is provided, the MANO can implement any one of the first aspect or the implementations of the first aspect. Operations and/or functions of all modules in the MANO are respectively configured to implement corresponding method features in the first aspect and the implementations of the first aspect. For brevity, details are not described herein.

According to a fourth aspect, a virtualized network function component VNFC in a network functions virtualization NFV architecture is provided, the VNFC can implement any one of the second aspect or the implementations of the second aspect. Operations and/or functions of all modules in the VNFC are respectively configured to implement corresponding method features in the second aspect and the implementations of the second aspect. For brevity, details are not described herein.

According to a fifth aspect, a network functions virtualization NFV system is provided, including:

the MANO according to the third aspect, the VNFC according to the fourth aspect, a storage network element, and a management network element, where the storage network element is configured to store a certificate of the VNFC, the storage network element is different from the VNFC, and the management network element is configured to update the certificate or cancel management on the certificate. The management network element may be the same as or different from the storage network element.

According to a sixth aspect, a processing apparatus is provided, and the processing apparatus is applied to an NFV system. The processing apparatus may be one or more processors or chips. In other possible cases, the processing apparatus may further be an entity apparatus or a virtual apparatus in the NFV system. The processing apparatus is configured to perform the certificate management method according to any one of the first aspect, the second aspect, or all the implementations of the first aspect and the second aspect.

According to a seventh aspect, a computer program product is provided, and the computer program product includes computer program code. When the computer program code is run by a computing unit, a processing unit, or a processor of an NFV system, the NFV system performs the certificate management method according to any one of the first aspect, the second aspect, or all the implementations of the first aspect and the second aspect.

According to an eighth aspect, a computer-readable storage medium is provided, the computer-readable storage medium stores a program, and the program enables an NFV system to perform the certificate management method according to any one of the first aspect, the second aspect, or all the implementations of the first aspect and the second aspect.

According to a ninth aspect, a program is provided, so that an NFV system performs the certificate management method according to any one of the first aspect, the second aspect, or all the implementations of the first aspect and the second aspect.

Based on the foregoing technical solutions, in the embodiments of the present application, the certificate of the VNFC is stored in the storage network element, so that the VNFC does not locally store the certificate, but directly communicates with another network element by using the certificate stored in the storage network element. Operations of the VNFC such as local copying and storing, updating, and deleting the certificate are avoided, and the certificate in the NFV architecture can further be effectively managed.

BRIEF DESCRIPTION OF THE DRAWINGS

To describe the technical solutions in the embodiments of the present application more clearly, the following briefly describes the accompanying drawings required for describing the embodiments of the present application. Apparently, the accompanying drawings in the following description show merely some embodiments of the present application, and persons of ordinary skill in the art may still derive other drawings from these accompanying drawings without creative efforts.

FIG. 2 is a schematic flowchart of a certificate management method in an NFV architecture according to an embodiment of the present application;

FIG. 3 is a schematic flowchart of a certificate management method in an NFV architecture according to another embodiment of the present application;

DETAILED DESCRIPTION

The following clearly describes the technical solutions in the embodiments of the present application with reference to the accompanying drawings in the embodiments of the present application. Apparently, the described embodiments are a part rather than all of the embodiments of the present application. All other embodiments obtained by persons of ordinary skill in the art based on the embodiments of the present application without creative efforts shall fall within the protection scope of the present application.

The following first describes a network functions virtualization (NFV) system of a method for upgrading a network functions virtualization NFV application according to an embodiment of the present application.

Figure 1:
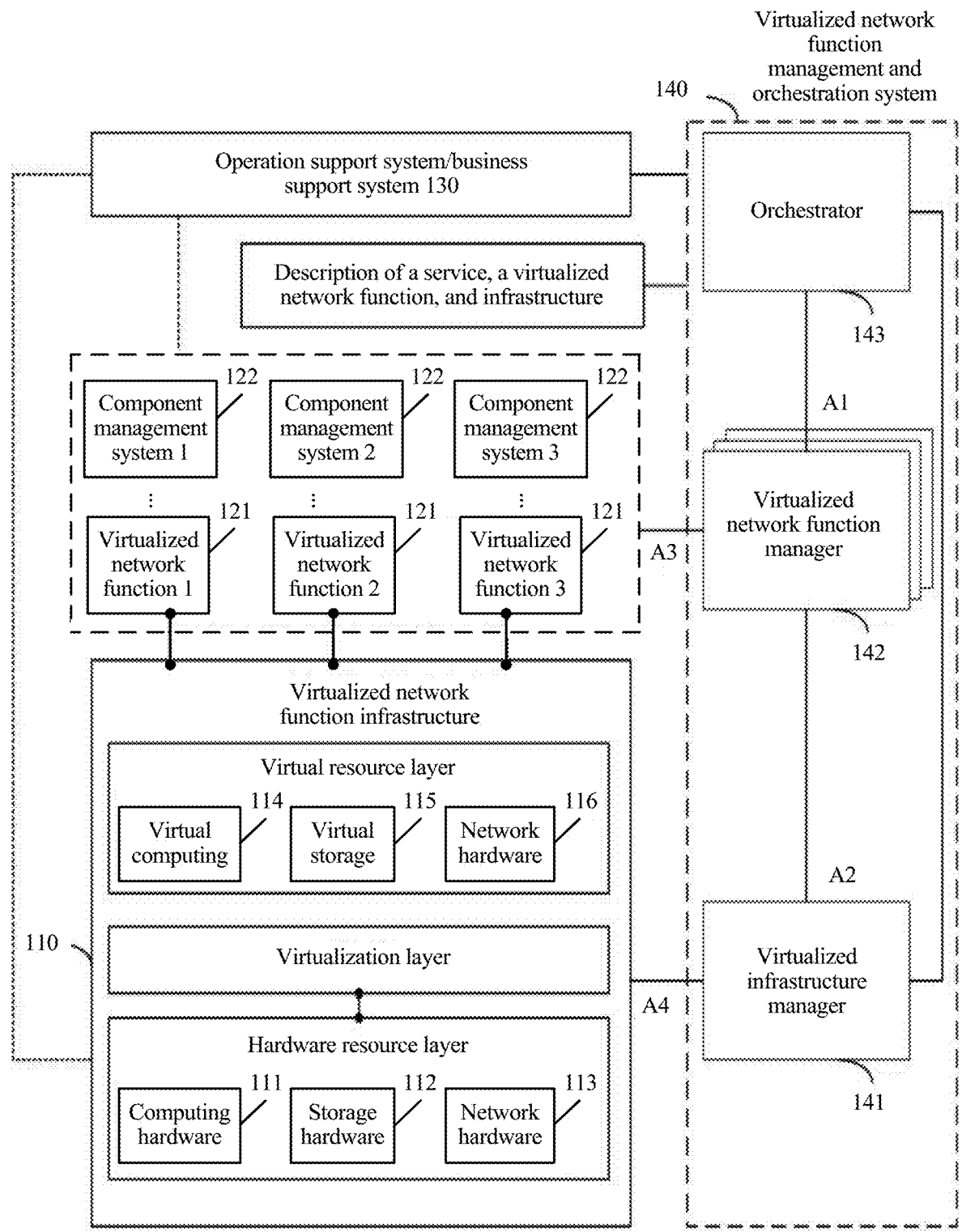
FIG. 1 is a schematic architecture diagram of an NFV system according to an embodiment of the present application.

FIG. 1 shows a schematic architecture diagram of an NFV system according to an embodiment of the present application. As shown in FIG. 1, an NFV reference architecture includes the following several main function components.

NFV infrastructure (NFVI) 110 provides a virtualization resource that is required for supporting execution of the NFV, and includes commodity off-the-shelf (COTS) hardware, a necessary accelerator component, and a software layer that performs virtualization and abstraction on underlying hardware.

For example, the NFVI 110 may include a hardware resource layer including computing hardware 111, storage hardware 112, and network hardware 113, a virtualization layer, and a virtual resource layer including virtual computing 114 (such as a virtual machine), a virtual storage 115, and a virtual network (network hardware) 116.

A virtual network function (VNF) 121 is a software implementation of a network function (NF) that can run on the NFVI, and may be accompanied by an element management system (EMS) 122 to understand and manage a separate VNF and a feature of the VNF. The VNF is equivalent to an entity of a network node, and is expected to be delivered as hardware-independent software.

An NFV management and orchestration (M&O or MANO) system 140 includes orchestration, lifecycle management of a physical and/or software resource that supports infrastructure virtualization, and VNF lifecycle management. The MANO system 140 focuses on a virtualization-specific management task in the NFV architecture. The MANO system 140 further interacts with an operation support system (OSS)/business support systems (BSS) 130 (that is outside the NFV), so that the NFV is allowed to be integrated into an existing network-wide management scenario.

The foregoing components perform interaction by using a defined reference point, so that different entities can be clearly decoupled, thereby facilitating an open and innovative NFV ecosystem. A reference point between the VNF 121 and the NFVI 110 (that between internal entities of the NFVI 110) processes resource abstraction and virtualization, and host homing of the VNF 121, so that the VNF 121 can move from one NFVI to another in the NFVI 110, to ensure that it is possible to select different underlying hardware. A reference point between the MANO system 140 and each of the VNF 121 and the NFVI 110 (that between internal entities of the NFV M&O) processes management and operation of the NFV system. Reusing an existing solution (for example, a cloud management system) is allowed in a design manner of related components, and the related components interact with an existing OSS/BSS environment to which the NFV system needs to connect.

In the MANO system 140, the following function components are further defined.

An NFV orchestrator (NFVO) 143 is mainly responsible for NS lifecycle management to implement a network service orchestration function, and for NFVI resource orchestration across multiple VIMs to implement a resource orchestration function.

A VNF manager (VNFM) 142 is responsible for lifecycle management of a VNF instance. It is assumed that each VNF has an associated VNFM, one VNFM may be assigned to manage a single VNF instance or manage multiple VNF instances of same or different types. Available capabilities of the VNF manager 142 include VNF instantiation, NFVI resource configuration for a VNF, VNF instance updating, VNF instance scaling, collection of NFVI performance measurements and events related to a VNF instance, and association with an event related to a VNF instance, VNF instance assisting or automated healing, VNF instance termination, integrity management on a VNF instance throughout its lifecycle, undertaking of an overall coordination and adaptation role for configuration and event report between NFVI and an EMS, and the like.

A virtualized infrastructure manager (VIM) 141 is responsible for managing and controlling computing, storage, and network resources of the NFVI 110, and generally is in an infrastructure subdomain of an operator. The VIM 141 may specially process NFVI resources of a specific type or may manage NFVI resources of multiple types. Available capabilities of the VIM 141 include orchestration on allocation/upgrade/deallocation/recycle of NFVI resources, management on association between virtualized resources and computing, storage, and network resources, management on a catalog of hardware resources (computing, storage, and network) and software resources (for example, management programs), collection and forwarding of performance measurements and events of virtualized resources, and the like.

Based on the foregoing architecture, an NS with a specific function may be implemented by using multiple NFs. An end-to-end NS implemented in a conventional network includes only physical network functions (PNF). For an end-to-end NS implemented in NFV, generally, there are still PNFs at two ends, but in the middle, some or all PNFs are replaced with VNFs. A function implemented by each NF and an external interface of each NF are irrelevant to whether the NF is a PNF or a VNF. A topological relationship formed by linking VNFs and PNFs may be described by using a VNF forwarding graph (VNFFG), and a characteristic of each NF may be described by using a corresponding network function descriptor (NFD).

The VNF needs to be implemented based on virtual resources (including virtual computing, storage, and network resources) provided by the NFVI, and these virtual resources are obtained by performing virtualization on corresponding physical resources. The PNF is directly implemented based on a physical resource. Unlike the conventional network in which all control is centralized on a network device integrated with software and hardware, the NFV introduces virtualization to implement decoupling of software and hardware of the network device, so that control over a service is mainly embodied in a PNF and VNF level, and control over performance is mainly embodied in the NFVI, especially in a hardware resource level of the NFVI.

In this embodiment of the present application, for implementing an automatic deployment procedure of upgrading a network functions virtualization NFV application, interfaces of all parts that are in a process of upgrading the NFV application and that are of the NFV system shown in FIG. 1 are defined. The NFVO invokes these interfaces in the process of upgrading the application, to implement an automatic procedure of upgrading an application.

A1: VNFM interfaces, for providing a capability of managing a VNF, including deploying and configuring the VNF. The following table lists some interfaces for implementing specific functions in the VNFM interfaces and parameters.

| Name | Parameter | Description |
|---|---|---|
| Create VNF | VNF version: VNF version number<br>Template ID: mirror ID<br>VCPU, MEM, DISK: specification configurations<br>Return value: VNF ID | For creating a VNF, including a VNF version number, a mirror, and specification information. |
| Delete VNF | VNF ID | For deleting a specified VNF. |

A2: VIM interfaces, which are interfaces for creating and operating resources provided by a cloud platform, mainly including interfaces for creating a virtual machine, configuring a network, and executing a script. In addition, the VIM interfaces may further include a special configuration interface for a VLB, to enhance management by the VLB on VNFs of different versions. The following table lists some interfaces for implementing specific functions in the VIM interfaces and parameters.

| Name | Parameter | Description |
|---|---|---|
| Add New VAPP To VLB | Version: VNF version number<br>VNF [ ]: information list of a new-version VNF, including information required by a VLB for connecting to a VNF, such as an IP address and a name | For adding a new application cluster to a load balancer. |
| Start Graceful Switchover | CallbackUrl: a callback interface, for sending completion information when switching is completed | For enabling a smooth switching procedure |
| Export VAPP Info From VLB | Return value:<br>VNF [ ]: VNF information list | For obtaining a VNF information list managed by a VLB |
| Import VAPP Info To VLB | VNF [ ]: VNF information list<br>Version: VNF version information | For importing VNF cluster information into a VLB |

A3: interfaces of an EMS element management system for VNF management, including VNF configuration and management interfaces.

A4: interfaces for interaction between a VIM and a virtual machine, for example, for virtual machine (VM) configuration, power-on, and software installation.

It should be understood that definitions of the interfaces of the parts in A1 to A4 are intended to help persons skilled in the art better understand the embodiments of the present application, but are not intended to limit the scope of the embodiments of the present application. Apparently, persons skilled in the art can make various equivalent modifications or variations according to the examples in A1 to A4, and such modifications or variations also fall within the scope of the embodiments of the present application.

FIG. 2 is a schematic flowchart of a certificate management method in an NFV architecture according to an embodiment of the present application. The method in FIG. 2 is applied to an NFV system 100, and may be executed by MANO. The method 200 shown in FIG. 2 includes the following steps.

210. The NFV management and orchestration system MANO determines a storage network element, the storage network element is configured to store a certificate of a virtualized network function component VNFC, and the storage network element is different from the VNFC.

220. The MANO creates storage space in the storage network element, and the storage space is used to store the certificate of the VNFC.

230. The MANO sends an address of the storage space to the VNFC.

Specifically, in this embodiment of the present application, the MANO determines the storage network element that stores the certificate of the VNFC, and the storage network element is different from the VNFC. The MANO creates the storage space in the storage network element of the certificate, and the storage space is used to store the certificate. The MANO sends the address of the storage space to the VNFC, so that the VNFC directly communicates with another network element by using the certificate stored in the storage network element. The VNFC does not locally store the certificate.

Therefore, in this embodiment of the present application, the certificate of the VNFC is stored in the storage network element, and the VNFC does not locally store the certificate, but directly communicates with another network element by using the certificate stored in the storage network element. Because the VNFC does not locally store the certificate, operations of the VNFC such as local copying and storing, updating, and deleting the certificate are avoided, and the certificate in the NFV architecture can further be effectively managed.

It should be noted that the MANO in this embodiment of the present application may include an NFVO, a VNFM, and a VIM. Specifically, a specific action performed by the MANO in this embodiment of the present application may be implemented by any one of the NFVO, the VNFM, or the VIM, or may be executed by the VNFM, the NFVO, or the VIM according to a specific case. This embodiment of the present application imposes no limitation thereto.

It should be understood that the VNFC directly uses the certificate in the storage network element, for example, the VNFC may obtain the certificate from the storage network element by using the address of the storage space, and communicate with another network element by using the certificate. The another network element may be any network element that the VNFC needs to communicate with in the NFV architecture, and this embodiment of the present application imposes no limitation thereto.

It should be noted that in the NFV architecture, the VNF may include at least one lower-level component (VNFC). Therefore, one VNF may be deployed on multiple virtual machines VMs, and each VM carries one VNFC. In this embodiment of the present application, the VNFC is a virtualized network function that is deployed (installed) on a VM.

It should be understood that the certificate in this embodiment of the present application represents a certificate that is owned by an entity (such as a VNFC) and that is used to certify an identity of the entity. A security connection between network elements can be established by means of certification of a certificate, so as to ensure confidentiality and integrity of communication. For example, the certificate in this embodiment of the present application may be an X.509-based certificate, and this embodiment of the present application imposes no limitation thereto.

It should further be understood that the storage network element determined by the MANO in this embodiment of the present application is different from the VNFC, and may be any network element that can store the certificate in the NFV. This embodiment of the present application imposes no limitation thereto. The following describes in detail how the MANO determines the storage network element.

It should be noted that the storage network element in this embodiment of the present application may further be the VNFC. When the storage network element is the VNFC, the method can also be implemented. When the storage network element is the VNFC, for differentiation from the prior art, a corresponding management network element described below may not be the VNFC, that is, the storage network element and the management network element cannot be the VNFC at the same time.

Optionally, in another embodiment, in 210, before the VNFC applies for a certificate or in a process in which the VNFC applies for a certificate, the MANO determines the storage network element that stores the certificate of the VNFC.

It should be understood that "before the VNFC applies for a certificate or in a process in which the VNFC applies for a certificate" may indicate "in a process of VNFC instantiation or after VNFC instantiation is performed", or may indicate "in a process of VNFC capacity expansion or after VNFC capacity expansion is performed".

The VNFC instantiation and the VNFC certificate application are two different processes. The VNFC instantiation and the VNFC certificate application may be performed simultaneously, or the VNFC instantiation may be performed before the certificate application.

Similarly, the VNFC capacity expansion and the VNFC certificate application are two different processes. The VNFC capacity expansion and the VNFC certificate application may be performed simultaneously, or the VNFC capacity expansion may be performed before the certificate application.

Specifically, under the NFV architecture, a VNF is a set of software and can be instantiated when needed. VNF instantiation is a process of determining and allocating a required virtualization resource for a VNF and installing an instance of the VNF. One VNF may have multiple instances at the same time. When a VNF undergoing an instantiation process or an instantiated VNF requires capacity expansion (scale-out), a new VNFC is created. If the new VNFC needs to perform external communication, an X.509-based certificate needs to be configured, so as to establish an IPsec or TLS security connection to a communication peer end, and protect confidentiality and integrity of the communication.

Optionally, in another embodiment, in 230, the MANO writes the address of the storage space into storage and management information of the certificate, and the MANO sends the storage and management information of the certificate to the VNFC.

For example, the storage and management information of the certificate is a part of VNFC instantiation parameters, and is used to indicate the address of the storage space.

Therefore, after certificate application, the VNFC may obtain the certificate according to the address, and further communicate with another network element.

For example, the storage and management information of the certificate may be in a virtualized network function component descriptor (VNFCD), and the MANO may send instantiation parameter information to a VIM, so that the VIM creates a virtual machine (VM) according to the instantiation parameters, and generates the VNFC.

In other words, the MANO system may send the storage and management information of the certificate and the instantiation parameter information of the VNFC to the VIM, so that the VIM generates the VNFC.

Further, in another embodiment, in 230, in a process of simultaneously performing VNFC instantiation and VNFC certificate application, or in a process of simultaneously performing VNFC capacity expansion and VNFC certificate application, or in a process of performing VNFC certificate application after VNFC instantiation is completed, or in a process of performing VNFC certificate application after VNFC capacity expansion is performed, the MANO sends the storage and management information of the certificate to the VNFC.

It should be understood that in this embodiment of the present application, the storage and management information of the certificate may be sent by the VNFM to the VNFC by using a Ve-Vnfm interface. This embodiment of the present application imposes no limitation on a specific message.

When communicating with another network element, the VNFC may obtain the certificate by using the address of the storage space in the storage and management information of the certificate, and communicate with the another network element.

It should be understood that a VNFC descriptor (VNCFD) is a resource description that describes a VNFC virtual resource requirement, and the NFV MANO performs a VNFC lifecycle operation (such as instantiation) by using the VNFCD.

The following describes, in detail by case, how the MANO determines the storage network element of the certificate.

First Case:

Optionally, in another embodiment, the method in this embodiment of the present application may further include:

obtaining, by the MANO, first indication information of the VNFC, where the first indication information is in an instantiation request message or a VNFCD of the VNFC, and the first indication information is used to indicate the storage network element.

In 210, the method includes: determining, by the MANO, the storage network element according to the first indication information of the VNFC.

Further, in another embodiment, the first indication information is further used to indicate a management network element of the certificate, and the management network element is configured to update the certificate or cancel management on the certificate.

In other words, the MANO determines the storage network element according to an indication of the first indication information, or the MANO determines the storage network element and the management network element according to the indication of the first indication information.

It should be understood that the first indication information may be a policy preset by an operator or a product provider, or the like. The policy may specify the storage network element of the certificate, or the storage network element and the management network element of the certificate.

It should further be understood that management performed by the management network element on the certificate may include management related to a certificate lifecycle, for example, certificate updating and cancellation, and this embodiment of the present application is not limited thereto. The certificate needs to be updated in the following cases: an application change of a certificate or verification material accompanied with a VNF lifecycle or a VNFC lifecycle, a storage change of a certificate or verification material accompanied with an infrastructure change (such as virtual machine migration or switching), regular updating of a certificate, and the like, and this embodiment of the present application is not limited thereto.

Second Case:

Alternatively, in another embodiment, the method in this embodiment of the present application may further include:

obtaining, by the MANO, second indication information of the VNFC, where the second indication information is in an instantiation request message or a VNFCD of the VNFC, the second indication information is used to indicate a decision network element, and the decision network element is configured to determine the storage network element of the certificate.

In 210, the MANO determines the storage network element according to a determining result of the decision network element.

Further, in another embodiment, the decision network element is further configured to determine a management network element of the certificate, and the management network element is configured to update the certificate or cancel management on the certificate.

It should be understood that the decision network element may be an NFVO, a VNFM, a VIM, or the like, and this embodiment of the present application is not limited thereto. For example, the decision network element may be a VNFM, and the storage network element and the management network element may be NFVOs.

It should be understood that the second indication information may be a policy preset by an operator or a product provider, or the like. The policy may specify the decision network element, so that the decision network element determines a storage network element, or a storage network element and a management network element.

It should further be understood that a decider (that is, the decision network element) of a storage location of the certificate described above may be the same as or different from a regulator (that is, the management network element) of the certificate. In an example embodiment, the decider and the regulator may be set as a same network element. In this case, implementation is simple.

Third Case:

Alternatively, in another embodiment, in 210, the MANO determines a storage network element according to a management policy.

Further, in another embodiment, the method in this embodiment of the present application may further include: determining, by the MANO, a management network element of the certificate according to the management policy, and the management network element is configured to update the certificate or cancel management on the certificate.

In other words, the MANO determines the storage network element, or the storage network element and the management network element according to the management policy.

For example, for reasons such as security or management convenience, the storage network element and the management network element may be determined by the MANO.

Optionally, in another embodiment, the storage network element is an NFVO, a VNFM, or a VIM, and the management network element is an NFVO, a VNFM, or a VIM; or the storage network element is a virtual machine VM, and the management network element is an NFVO, an NFVM, a VIM, or a master virtualized network function component master VNFC; or the storage network element is a master VNFC, and the management network element is a master VNFC.

It should be understood that when the storage network element is another VNFC other than the VNFC in the VNF, the storage network element (the other VNFC) is referred to as a master VNFC.

Optionally, in another embodiment, a certificate of the VNFC is a certificate that is obtained after the VNFC is registered with and certified by a certificate authority CA.

Specifically, after the certification of the certificate, the VNFC sends the certificate to the storage network element, so that the storage network element stores the certificate.

The foregoing describes the certificate management method in the embodiments of the present application in detail with reference to FIG. 2. The following describes a certificate management method in another embodiment of the present application with reference to FIG. 3.

FIG. 3 is a schematic flowchart of a certificate management method in an NFV architecture according to another embodiment of the present application. The method shown in FIG. 3 may be executed by a VNFC. Specifically, a method 300 shown in FIG. 3 includes the following steps.

310. The VNFC receives an address of storage space that is sent by an NFV management and orchestration system MANO, the storage space is used to store a certificate of the VNFC, the storage space is located in a storage network element, and the storage network element is different from the VNFC.

320. The VNFC obtains the certificate of the VNFC by accessing the address of the storage space.

Specifically, the VNFC receives the address of the storage space that is sent by the MANO, and the VNFC obtains the certificate of the VNFC by accessing the address of the storage space. The VNFC may directly communicate with another network element by using the certificate, and the VNFC does not locally store the certificate.

Therefore, in this embodiment of the present application, the VNFC directly obtains the certificate in the storage network element, to communicate with another network element, and the VNFC does not locally store the certificate. Because the VNFC does not locally store the certificate, operations of the VNFC such as local copying and storing, updating, and deleting the certificate are avoided, and the certificate in the NFV architecture can further be effectively managed.

Optionally, in another embodiment, before 310, the method in this embodiment of the present application may further include:

registering, by the VNFC, with a certificate authority (CA) and attempting to be certified by the CA, to obtain the certificate; and sending, by the VNFC, the certificate to the storage network element, so that the storage network element stores the certificate in the storage space.

Specifically, after the certification of the certificate, the VNFC sends the certificate to the storage network element, so that the storage network element stores the certificate. When the VNFC communicates with another network element, the VNFC obtains the certificate from the storage network element according to the address of the storage space of the certificate of the VNFC, and the storage network element is different from the VNFC. The VNFC directly communicates with another network element by using the certificate, and the VNFC does not locally store the certificate. Because the VNFC does not locally store the certificate, operations of the VNFC such as local copying and storing, updating, and deleting the certificate are avoided, and the certificate in the NFV architecture can further be effectively managed.

Optionally, in another embodiment, after 320, the method in this embodiment of the present application may further include:

receiving, by the VNFC, a certificate invalidity indication message sent by a management network element; and deleting, by the VNFC according to the invalidity indication message, the address of the storage space, or setting the address of the storage space to be invalid.

Specifically, when the certificate of the VNFC is invalid (that is, the certificate becomes ineffective), the management network element sends the certificate invalidity indication message to the VNFC, and the VNFC indicates, according to the invalidity indication message, that the certificate is invalid, so that the VNFC deletes the address of the storage space, or sets the address of the storage space to be invalid.

The foregoing describes the certificate management method in the embodiments of the present application in detail with reference to FIG. 1 to FIG. 3. The following describes the certificate management method in the embodiments of the present application in detail with reference to a specific example.

Figure 4A:
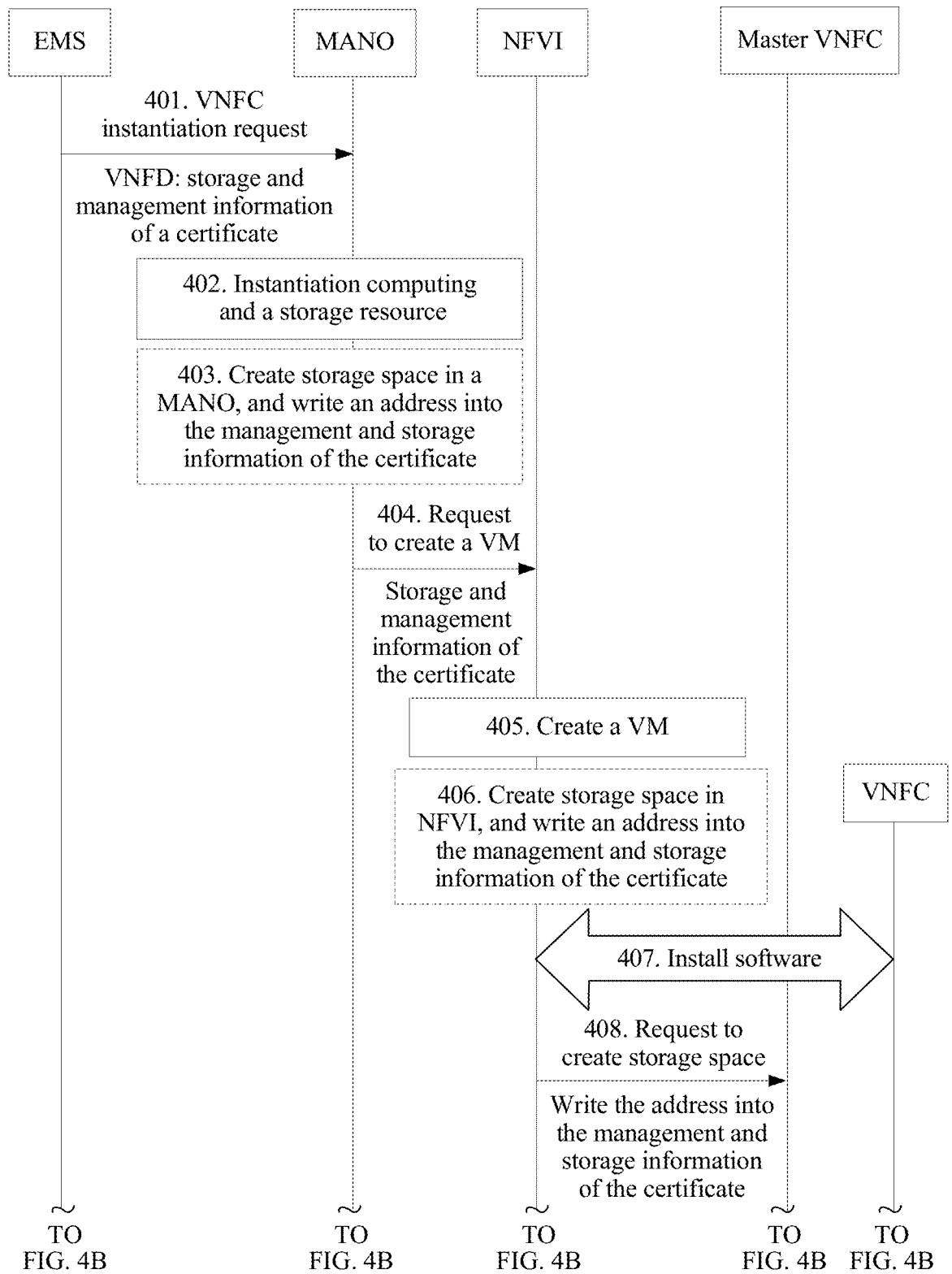
FIG. 4A and FIG. 4B are a schematic flowchart of a certificate management method in an NFV architecture according to another embodiment of the present application.
Figure 4B:
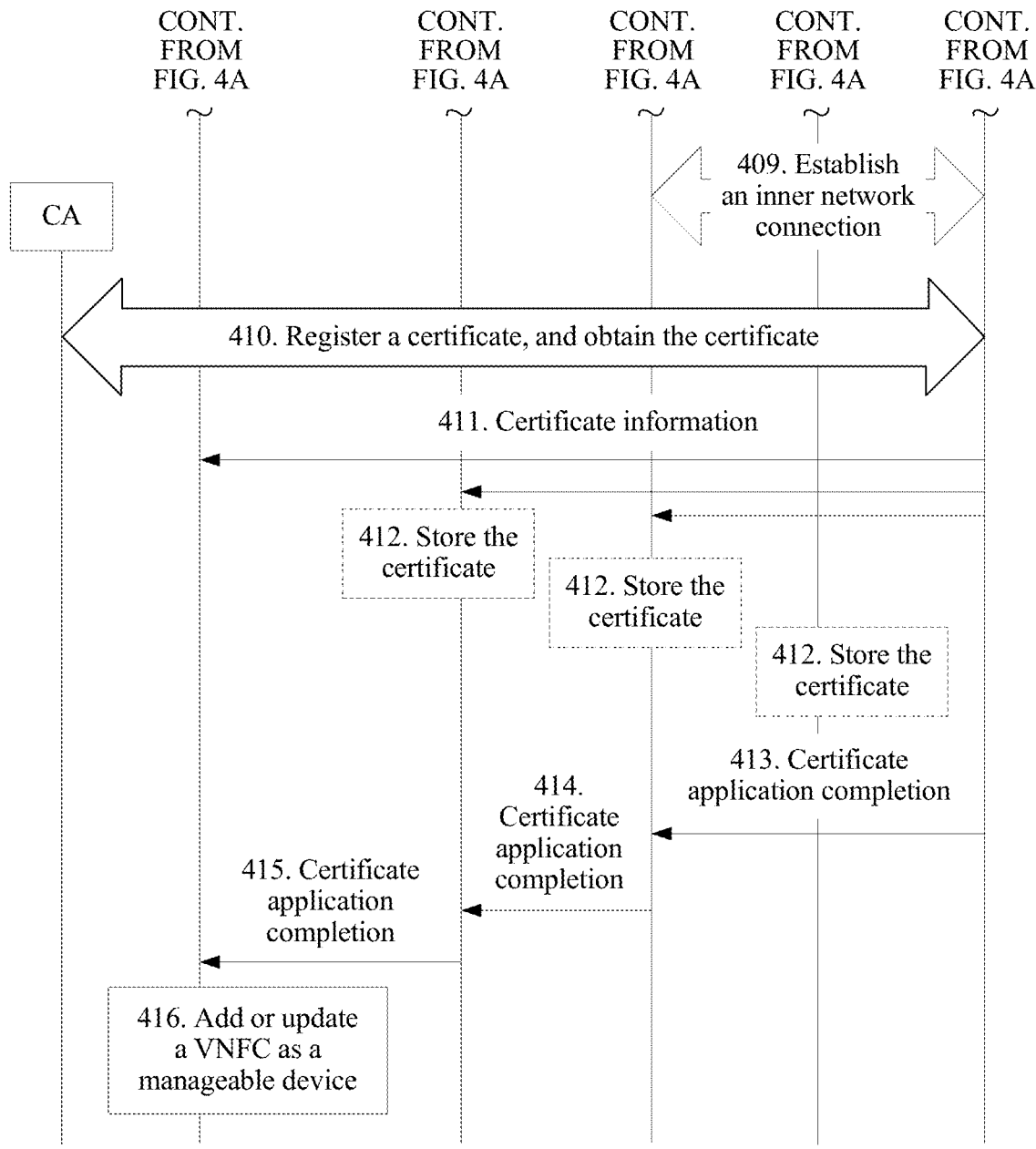

FIG. 4A and FIG. 4B are a schematic flowchart of a certificate management method in an NFV architecture according to another embodiment of the present application. The method shown in FIG. 4A and FIG. 4B is applied to the NFV architecture and includes the following steps.

401. MANO receives a trigger signal of an operation. The operation includes VNFC instantiation or VNF capacity expansion. That MANO receives a trigger signal of an operation includes: The MANO receives a message that requests instantiation or capacity expansion and that is triggered by a manual or automatic event of an EMS, or the MANO collects measurement data from a VNF and finds that capacity expansion is required. The capacity expansion message includes storage and management information of a certificate of a VNFC.

The storage and management information of the certificate of the VNFC is stored in a VNFD and specifically includes a storage location (for example, the certificate may be stored in a VM, MANO, or a VNF in NFVI) and manager of the certificate.

402. The MANO performs computing required in the instantiation and determines a storage resource, including determining storage space of a certificate.

The certificate may be stored in different network elements. If the certificate is stored in the MANO, 403 is performed; or if the certificate is stored in the NFVI, for example, the certificate is stored in a VM, 406 is performed; or if the certificate is required to be stored in the VNFC (referred to as a master VNFC), 408 is performed. A detailed description is provided below.

403. Optionally, if the certificate is required to be stored in the MANO, create the storage space of the certificate, and write an address of the space into storage and management information of the certificate.

404. The MANO instructs NFVI to create a VM. In this process, the MANO sends the storage and management information of the certificate of the VNFC to the NFVI.

405. The NFVI creates a VM, and sends an acknowledgement message to the MANO. Step 410 is subsequently performed.

406. Optionally, if the certificate is required to be stored in NFVI, create the storage space of the certificate, and write an address of the space into storage and management information of the certificate.

407. The NFVI installs VNFC software on a VM by using a secure boot process. Step 410 is subsequently performed.

408. Optionally, if the certificate is required to be stored in a VNFC (referred to as a master VNFC, which may be the VNFC installed this time), create storage space of the certificate, and write an address of the space into storage and management information of the certificate. The storage and management information of the certificate is installed on the VNFC. If a newly-installed VNFC and the master VNFC are a same VNFC, step 410 is subsequently performed; or if a newly-installed VNFC and the master VNFC are different VNFCs, 409 is performed.

409. A newly-installed VNFC instance establishes an internal network connection to the master VNFC by using the NFVI. If the newly-installed VNFC and the master VNFC are a same VNFC, this step is omitted.

410. The New VNFC instance performs a certificate registration process with a CA, to obtain a formal certificate issued by an operator.

Optionally, the master VNFC is used as a proxy, and replaces the new VNFC instance to perform the certificate registration process with the CA.

Optionally, the MANO is used as a proxy, and replaces the new VNFC instance to perform the certificate registration process with the CA.

411. A new VNFC sends VNFC certificate information to the MANO, or the NFVI, or the master VNFC. The VNFC certificate information includes the certificate of the VNFC.

412. The MANO, the NFVI, or the master VNFC stores the certificate information.

413. The VNFC acknowledges to the NFVI that certificate application is completed.

414. The NFVI acknowledges to the MANO that the certificate application is completed.

415. The MANO sends an acknowledgement message to an EMS.

416. The EMS adds or updates the VNFC as a manageable device.

It should be understood that FIG. 4A and FIG. 4B show only a case of a specific embodiment in which the MANO determines a storage network element according to an indication of first indication information (for example, a message that requests instantiation or capacity expansion).

This embodiment of the present application may further include another variant form. A difference between another embodiment and the embodiment in FIG. 4A and FIG. 4B lies in a difference in a manner of determining a storage network element and a management network element. For example, the MANO determines the storage network element and the management network element according to an indication of second indication information, the second indication information is used to indicate a decision network element, and the decision network element determines the storage network element and the management network element, and then notifies the MANO of the storage network element and the management network element. For another example, the MANO determines the storage network element and the management network element according to a management policy of the MANO instead of an indication of another message.

It should be noted that a difference between a specific variant form of the embodiment in FIG. 4A and FIG. 4B and the embodiment in FIG. 4A and FIG. 4B lies in a difference in the foregoing manner of determining a storage network element and a management network element, and other parts are basically the same. To avoid repetition, details are not described herein again.

In other words, the example in FIG. 4A and FIG. 4B is merely intended to help persons skilled in the art understand the embodiments of the present application rather than limit the embodiments of the present application to a specific numerical value or a specific scenario in the example. Apparently, persons skilled in the art can perform various equivalent modifications or changes according to the example provided in FIG. 4A and FIG. 4B, and such modifications or changes also fall within the scope of the embodiments of the present application.

The foregoing describes the certificate management method in the embodiments of the present application in detail with reference to FIG. 1 to FIG. 4A and FIG. 4B. The following describes a certificate management apparatus in the embodiments of the present application with reference to FIG. 5 to FIG. 9.

Figure 5:
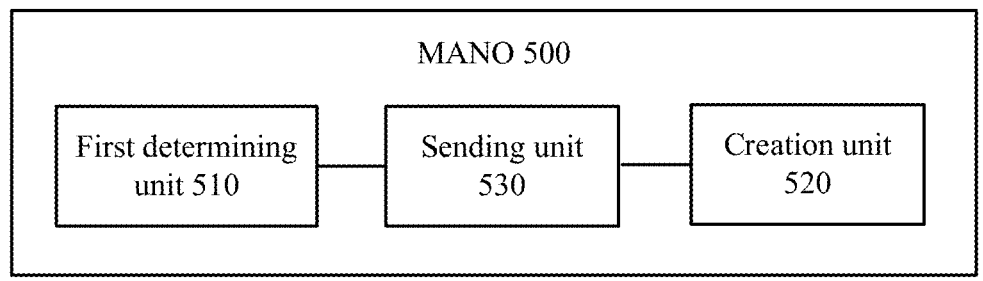
FIG. 5 is a schematic block diagram of a MANO in an NFV architecture according to an embodiment of the present application.

FIG. 5 is a schematic block diagram of an NFV management and orchestration system MANO in a network functions virtualization NFV architecture according to an embodiment of the present application. It should be understood that MANO 500 shown in FIG. 5 can implement each process related to the MANO in the method embodiments in FIG. 2 to FIG. 4A and FIG. 4B. Operations and/or functions of all modules in the MANO 500 are respectively intended to implement corresponding procedures in the method embodiments in FIG. 2 to FIG. 4A and FIG. 4B. For details, refer to the description in the method embodiments. To avoid repetition, detailed descriptions are appropriately omitted herein.

The MANO 500 shown in FIG. 5 includes a first determining unit 510, a creation unit 520, and a sending unit 530.

Specifically, the first determining unit 510 is configured to determine a storage network element, the storage network element is configured to store a certificate of a VNFC, and the storage network element is different from the VNFC. The creation unit 520 is configured to create storage space in the storage network element, and the storage space is used to store the certificate of the VNFC. The sending unit 530 is configured to send an address of the storage space to the VNFC.

The VNFC obtains the certificate of the VNFC by accessing the address of the storage space, and directly communicates with another network element by using the certificate stored in the storage network element, and the VNFC does not locally store the certificate.

Therefore, in this embodiment of the present application, the certificate of the VNFC is stored in the storage network element, and the VNFC does not locally store the certificate, but directly communicates with another network element by using the certificate stored in the storage network element. Because the VNFC does not locally store the certificate, operations of the VNFC such as local copying and storing, updating, and deleting the certificate are avoided, and the certificate in the NFV architecture can further be effectively managed.

Optionally, in another embodiment, the first determining unit 510 is specifically configured to: before the VNFC applies for a certificate or in a process in which the VNFC applies for a certificate, determine the storage network element that stores the certificate of the VNFC.

Optionally, in another embodiment, the sending unit 530 is specifically configured to: write the address of the storage space into storage and management information of the certificate, and send the storage and management information of the certificate to the VNFC.

Further, in another embodiment, the sending unit 530 is specifically configured to: in a process of simultaneously performing VNFC instantiation and VNFC certificate application, or in a process of simultaneously performing VNFC capacity expansion and VNFC certificate application, or in a process of performing VNFC certificate application after VNFC instantiation is completed, or in a process of performing VNFC certificate application after VNFC capacity expansion is performed, send the storage and management information of the certificate to the VNFC.

Optionally, in another embodiment, the MANO further includes:

a first obtaining unit, configured to obtain first indication information of the VNFC, where the first indication information is in an instantiation request message or a virtualized network function component descriptor (VNFCD) of the VNFC, and the first indication information is used to indicate the storage network element.

The first determining unit 510 is specifically configured to determine the storage network element according to the first indication information of the VNFC.

Further, in another embodiment, the first indication information is further used to indicate a management network element of the certificate, and the management network element is configured to update the certificate or cancel management on the certificate.

Alternatively, in another embodiment, the MANO further includes:

a second obtaining unit, configured to obtain second indication information of the VNFC, where the second indication information is in an instantiation request message or a VNFCD of the VNFC, the second indication information is used to indicate a decision network element, and the decision network element is configured to determine the storage network element of the certificate.

The first determining unit 510 is specifically configured to determine the storage network element according to a determining result of the decision network element.

Further, in another embodiment, the decision network element is further configured to determine a management network element of the certificate, and the management network element is configured to update the certificate or cancel management on the certificate.

Alternatively, in another embodiment, the first determining unit 510 is specifically configured to determine the storage network element according to a management policy.

Further, in another embodiment, the MANO further includes:

a second determining unit, configured to determine a management network element of the certificate according to the management policy, where the management network element is configured to update the certificate or cancel management on the certificate.

Optionally, in another embodiment, the storage network element is a network functions virtualization orchestrator NFVO, a virtualized network function manager VNFM, or a virtualized infrastructure manager VIM, and the management network element is an NFVO, a VNFM, or a VIM; or the storage network element is a virtual machine VM, and the management network element is an NFVO, an NFVM, a VIM, or a master virtualized network function component (master VNFC); or the storage network element is a master VNFC, and the management network element is a master VNFC.

Optionally, in another embodiment, a certificate of the VNFC is a certificate that is obtained after the VNFC is registered with and certified by a certificate authority CA.

Figure 6:
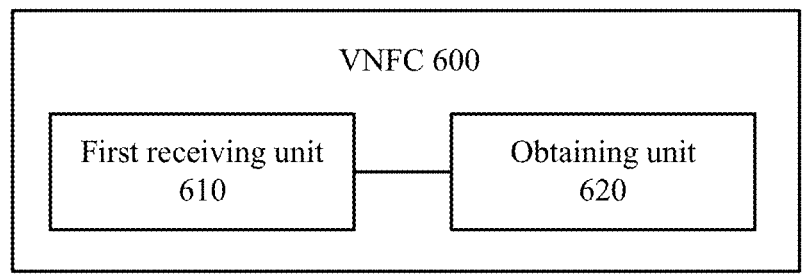
FIG. 6 is a schematic block diagram of a VNFC in an NFV architecture according to an embodiment of the present application.

FIG. 6 is a schematic block diagram of a VNFC in an NFV architecture according to an embodiment of the present application. It should be understood that a VNFC 600 shown in FIG. 6 can implement each process related to the VNFC in the method embodiments in FIG. 2 to FIG. 4A and FIG. 4B. Operations and/or functions of all modules in the VNFC 600 are respectively intended to implement corresponding procedures in the method embodiments in FIG. 2 to FIG. 4A and FIG. 4B. For details, refer to the description in the method embodiments. To avoid repetition, detailed descriptions are appropriately omitted herein.

The VNFC 600 shown in FIG. 6 includes a first receiving unit 610 and an obtaining unit 620.

Specifically, the first receiving unit 610 is configured to receive an address of storage space that is sent by an NFV management and orchestration system MANO, the storage space is used to store a certificate of the VNFC, the storage space is located in a storage network element, and the storage network element is different from the VNFC. The obtaining unit 620 is configured to obtain the certificate of the VNFC by accessing the address of the storage space.

After obtaining the certificate, the VNFC may directly communicate with another network element by using the certificate, and the VNFC does not locally store the certificate.

Therefore, in this embodiment of the present application, the VNFC directly obtains the certificate in the storage network element, to communicate with another network element, and the VNFC does not locally store the certificate. Because the VNFC does not locally store the certificate, operations of the VNFC such as local copying and storing, updating, and deleting the certificate are avoided, and the certificate in the NFV architecture can further be effectively managed.

Optionally, in another embodiment, the VNFC 600 may further include a certification unit. Specifically, the certification unit is configured to obtain the certificate after the VNFC is registered with and certified by a certificate authority CA.

Optionally, in another embodiment, the VNFC 600 may further include a second receiving unit and a deletion unit. Specifically, the second receiving unit is configured to receive a certificate invalidity indication message sent by a management network element; and the deletion unit is configured to: delete, according to the invalidity indication message, the address of the storage space, or set the address of the storage space to be invalid.

Figure 7:
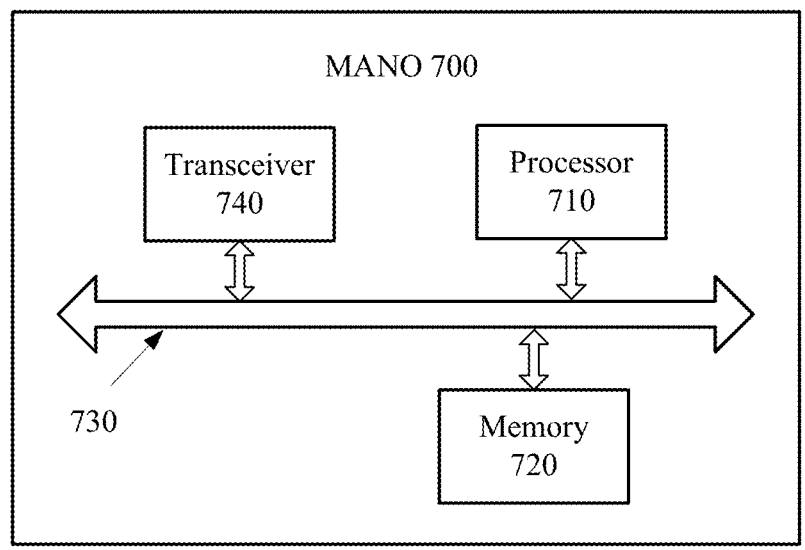
FIG. 7 is a schematic block diagram of a MANO in an NFV architecture according to another embodiment of the present application.

FIG. 7 is a schematic block diagram of an NFV management and orchestration system MANO in a network functions virtualization NFV architecture according to another embodiment of the present application. It should be understood that MANO 700 shown in FIG. 7 can implement each process related to the MANO in the method embodiments in FIG. 2 to FIG. 4A and FIG. 4B. For a specific function of the MANO 700, refer to the description in the method embodiments. To avoid repetition, detailed descriptions are appropriately omitted herein.

The MANO 700 shown in FIG. 7 includes a processor 710, a memory 720, a bus system 730, and a transceiver 740. The processor 710, the memory 720, and the transceiver 740 are connected by using the bus system 730. The memory 720 is configured to store an instruction, and the processor 710 is configured to execute the instruction stored in the memory 720, to determine a storage network element. The storage network element is configured to store a certificate of a VNFC, and the storage network element is different from the VNFC. Storage space is created in the storage network element, and the storage space is used to store the certificate of the VNFC. The transceiver 740 is configured to send an address of the storage space to the VNFC.

The VNFC obtains the certificate of the VNFC by accessing the address of the storage space, and directly communicates with another network element by using the certificate stored in the storage network element, and the VNFC does not locally store the certificate.

Therefore, in this embodiment of the present application, the certificate of the VNFC is stored in the storage network element, and the VNFC does not locally store the certificate, but directly communicates with another network element by using the certificate stored in the storage network element. Because the VNFC does not locally store the certificate, operations of the VNFC such as local copying and storing, updating, and deleting the certificate are avoided, and the certificate in the NFV architecture can further be effectively managed.

The method disclosed in the foregoing embodiments of the present application may be applied to the processor 710, or implemented by the processor 710. The processor 710 may be an integrated circuit chip and has a signal processing capability. In an implementation process, the steps of the foregoing methods may be completed by an integrated logical circuit of hardware in the processor 710 or an instruction in a form of software. The processor 710 may be a general-purpose processor, a digital signal processor (DSP), an application-specific integrated circuit (ASIC), a field programmable gate array (FPGA) or another programmable logic device, a discrete gate or transistor logic device, or a discrete hardware assembly. The processor 710 can implement or execute the methods, steps, and logical block diagrams disclosed in the embodiments of the present application. The general-purpose processor may be a microprocessor, or the processor may be any conventional processor. The steps of the method disclosed with reference to the embodiments of the present application may be directly performed and completed by using a hardware decoding processor, or performed and completed by using a combination of hardware and software modules in a decoding processor. The software module may be located in a mature storage medium in the art, such as a random access memory (RAM), a flash memory, a read-only memory (ROM), a programmable read-only memory or an electrically erasable programmable memory, or a register. The storage medium is located in the memory 720. The processor 710 reads information from the memory 720, and completes the steps of the foregoing method in combination with hardware of the processor 710. In addition to a data bus, the bus system 730 may further include a power bus, a control bus, a status signal bus, and the like. However, for clear description, various types of buses in the figure are marked as the bus system 730.

Optionally, in another embodiment, the processor 710 is specifically configured to: before the VNFC applies for a certificate or in a process in which the VNFC applies for a certificate, determine the storage network element that stores the certificate of the VNFC.

Optionally, in another embodiment, the transceiver 740 is specifically configured to: write the address of the storage space into storage and management information of the certificate, and send the storage and management information of the certificate to the VNFC.

Further, in another embodiment, the transceiver 740 is specifically configured to:

in a process of simultaneously performing VNFC instantiation and VNFC certificate application, or in a process of simultaneously performing VNFC capacity expansion and VNFC certificate application, or in a process of performing VNFC certificate application after VNFC instantiation is completed, or in a process of performing VNFC certificate application after VNFC capacity expansion is performed, send the storage and management information of the certificate to the VNFC.

Optionally, in another embodiment, the transceiver 740 is further configured to obtain first indication information of the VNFC, the first indication information is in an instantiation request message or a VNFCD of the VNFC, and the first indication information is used to indicate the storage network element.

The processor 710 is specifically configured to determine the storage network element according to the first indication information of the VNFC.

Further, in another embodiment, the first indication information is further used to indicate a management network element of the certificate, and the management network element is configured to update the certificate or cancel management on the certificate.

Alternatively, in another embodiment, the transceiver 740 is further configured to obtain second indication information of the VNFC, the second indication information is in an instantiation request message or a VNFCD of the VNFC, the second indication information is used to indicate a decision network element, and the decision network element is configured to determine the storage network element of the certificate.

The processor 710 is specifically configured to determine the storage network element according to a determining result of the decision network element.

Further, in another embodiment, the decision network element is further configured to determine a management network element of the certificate, and the management network element is configured to update the certificate or cancel management on the certificate.

Alternatively, in another embodiment, the processor 710 is specifically configured to determine the storage network element according to a management policy.

Further, in another embodiment, the processor 710 is further configured to determine a management network element of the certificate according to the management policy, and the management network element is configured to update the certificate or cancel management on the certificate.

Optionally, in another embodiment, the storage network element is a network functions virtualization orchestrator NFVO, a virtualized network function manager VNFM, or a virtualized infrastructure manager VIM, and the management network element is an NFVO, a VNFM, or a VIM; or the storage network element is a virtual machine VM, and the management network element is an NFVO, an NFVM, a VIM, or a master VNFC; or the storage network element is a master VNFC, and the management network element is a master VNFC.

Optionally, in another embodiment, a certificate of the VNFC is a certificate that is obtained after the VNFC is registered with and certified by a certificate authority CA.

Figure 8:
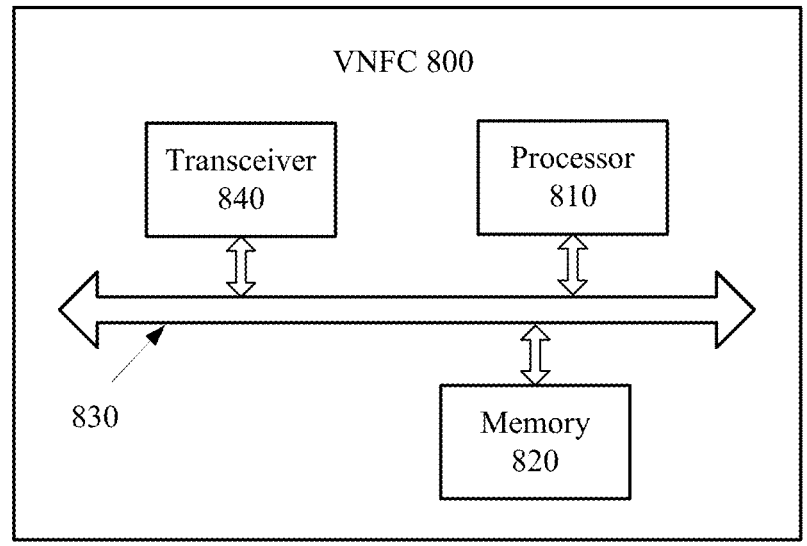
FIG. 8 is a schematic block diagram of a VNFC in an NFV architecture according to another embodiment of the present application.

FIG. 8 is a schematic block diagram of a VNFC in an NFV architecture according to another embodiment of the present application. It should be understood that a VNFC 800 shown in FIG. 8 can implement each process related to the VNFC in the method embodiments in FIG. 2 to FIG. 4A and FIG. 4B. Operations and/or functions of all modules in the VNFC 800 are respectively intended to implement corresponding procedures in the method embodiments in FIG. 2 to FIG. 4A and FIG. 4B. For details, refer to the description in the method embodiments. To avoid repetition, detailed descriptions are appropriately omitted herein.

As shown in FIG. 8, the VNFC 800 includes a processor 810, a memory 820, a bus system 830, and a transceiver 840. The processor 810, the memory 820, and the transceiver 840 are connected by using the bus system 830, the memory 820 is configured to store an instruction, and the processor 810 is configured to execute the instruction stored in the memory 820.

The transceiver 840 is configured to receive an address of storage space that is sent by MANO, the storage space is used to store a certificate of the VNFC, the storage space is located in a storage network element, and the storage network element is different from the VNFC. The processor 810 is configured to: obtain the certificate of the VNFC by accessing the address of the storage space.

After obtaining the certificate, the VNFC may directly communicate with another network element by using the certificate, and the VNFC does not locally store the certificate.

Therefore, in this embodiment of the present application, the VNFC directly obtains the certificate in the storage network element, to communicate with another network element, and the VNFC does not locally store the certificate. Because the VNFC does not locally store the certificate, operations of the VNFC such as local copying and storing, updating, and deleting the certificate are avoided, and the certificate in the NFV architecture can further be effectively managed.

The method disclosed in the foregoing embodiments of the present application may be applied to the processor 810, or implemented by the processor 810. The processor 810 may be an integrated circuit chip and has a signal processing capability. In an implementation process, the steps of the foregoing methods may be completed by an integrated logical circuit of hardware in the processor 810 or an instruction in a form of software. The processor 810 may be a general-purpose processor, a DSP, an application-specific integrated circuit (ASIC), a field programmable gate array (FPGA) or another programmable logic device, a discrete gate or transistor logic device, or a discrete hardware assembly. The processor 810 can implement or execute the methods, steps, and logical block diagrams disclosed in the embodiments of the present application. The general-purpose processor may be a microprocessor, or the processor may be any conventional processor. The steps of the method disclosed with reference to the embodiments of the present application may be directly performed and completed by using a hardware decoding processor, or performed and completed by using a combination of hardware and software modules in a decoding processor. The software module may be located in a mature storage medium in the art, such as a random access memory (RAM), a flash memory, a read-only memory (ROM), a programmable read-only memory or an electrically erasable programmable memory, or a register. The storage medium is located in the memory 820. The processor 810 reads information from the memory 820, and completes the steps of the foregoing method in combination with hardware of the processor 810. In addition to a data bus, the bus system 830 may further include a power bus, a control bus, a status signal bus, and the like. However, for clear description, various types of buses in the figure are marked as the bus system 830.

Optionally, in another embodiment, the processor 810 is configured to obtain the certificate after the VNFC is registered with and certified by a certificate authority CA. The transceiver 840 is further configured to send the certificate to the storage network element, so that the storage network element stores the certificate in the storage space.

Optionally, in another embodiment, the transceiver 840 is further configured to receive a certificate invalidity indication message sent by a management network element; and the processor 810 is further configured to: delete, according to the invalidity indication message, the address of the storage space, or set the address of the storage space to be invalid.

Figure 9:
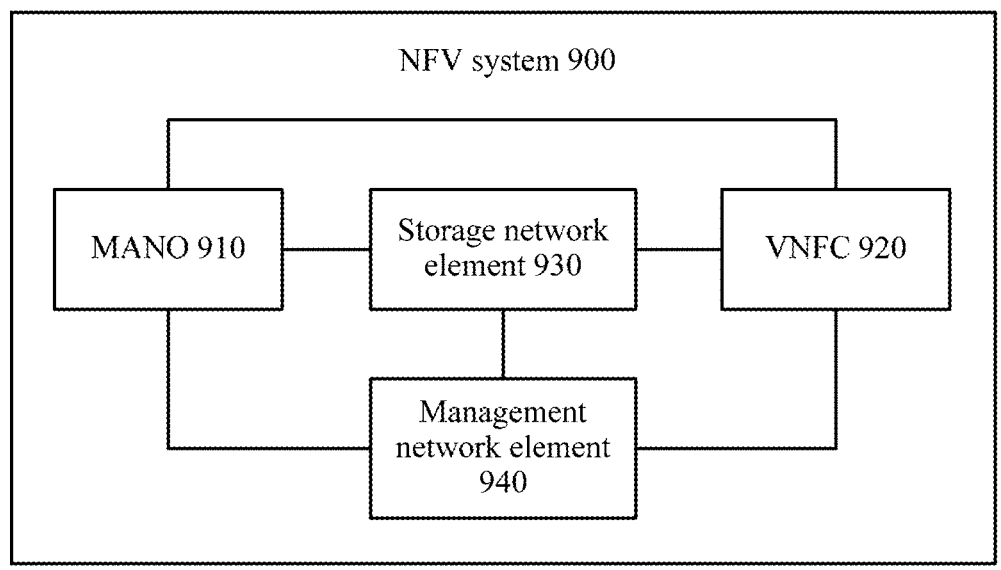
FIG. 9 is a schematic block diagram of an NFV system according to an embodiment of the present application.

FIG. 9 is a schematic block diagram of a network functions virtualization NFV system according to an embodiment of the present application. An NFV system 900 shown in FIG. 9 includes an NFV management and orchestration system MANO 910, a virtualized network function component VNFC 920, a storage network element 930, and a management network element 940.

Specifically, the MANO 910 is corresponding to the NFV management and orchestration system MANO shown in FIG. 5 or FIG. 7, the VNFC 920 is corresponding to the VNFC shown in FIG. 6 or FIG. 8. The storage network element 930 is configured to store a certificate of the VNFC, and the storage network element 930 is different from the VNFC 920. The management network element 940 is configured to update the certificate or cancel management on the certificate.

It should be understood that the NFV system shown in FIG. 9 can implement each process in the method embodiments in FIG. 1 to FIG. 4A and FIG. 4B. Operations and/or functions of all modules in the NFV system 900 are respectively intended to implement corresponding procedures in the method embodiments in FIG. 2 to FIG. 4A and FIG. 4B. For details, refer to the description in the method embodiments. To avoid repetition, detailed descriptions are appropriately omitted herein.

It should be understood that "an embodiment" or "an embodiment" mentioned in the whole specification does not mean that particular features, structures, or characteristics related to the embodiment are included in at least one embodiment of the present application. Therefore, "in an embodiment" or "in an embodiment" appearing throughout the specification does not refer to a same embodiment. In addition, these particular features, structures, or characteristics may be combined in one or more embodiments by using any appropriate manner. It should be understood that sequence numbers of the foregoing processes do not mean execution sequences in various embodiments of the present application. The execution sequences of the processes should be determined according to functions and internal logic of the processes, and should not be construed as any limitation on the implementation processes of the embodiments of the present application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present application, "B corresponding to A" indicates that B is associated with A, and B may be determined according to A. However, it should further be understood that determining A according to B does not mean that B is determined according to A only; that is, B may also be determined according to A and/or other information.

Persons of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present application.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present application.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, persons skilled in the art may clearly understand that the present application may be implemented by hardware, firmware or a combination thereof. When the present application is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present application includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely example embodiments of the technical solutions of the present application, but is not intended to limit the protection scope of the present application. Any modification, equivalent replacement, or improvement made without departing from the spirit and principle of the present application shall fall within the protection scope of the present application.

What is claimed is:

1. A method implemented by a network functions virtualization (NFV) management and network orchestration (MANO) system and comprising:
obtaining first indication information of a virtualized network function component (VNFC), wherein the first indication information is in an instantiation request message or a virtualized network function component descriptor (VNFCD) of the VNFC, and wherein the first indication information indicates a decision network element for determining a storage network element;
determining, according to a determining result of the decision network element, the storage network element for storing all of a certificate of the VNFC without dividing the certificate, wherein the storage network element is different from the VNFC;
creating a storage space in the storage network element for storing the certificate; and
sending an address of the storage space to the VNFC.

2. The method of claim 1, further comprising further determining the storage network element before or during a process in which the VNFC applies for the certificate.

3. The method of claim 1, further comprising further sending the address in storage and management information of the certificate.

4. The method of claim 1, wherein the first indication information is in the instantiation request message.

5. The method of claim 1, wherein the first indication information is in the VNFCD.

6. The method of claim 1, further comprising further determining the storage network element according to a management policy.

7. The method of claim 1, wherein the certificate is from a certificate authority (CA) after the VNFC is registered with and certified by the CA.

8. A method implemented by a virtualized network function component (VNFC) and comprising:
receiving, from a network functions virtualization (NFV) management and orchestration (MANO) system, an address of a storage space, wherein the storage space is for storing all of a certificate of the VNFC without dividing the certificate, wherein the storage space is located in a storage network element, and wherein the storage network element is different from the VNFC;
accessing the storage space according to the address to obtain the certificate;
receiving a certificate invalidity indication message from a management network element; and
deleting the address of the storage space or setting the address of the storage space to be invalid according to the certificate invalidity indication message.

9. The method of claim 8, further comprising:
registering with a certificate authority (CA); and
attempting to be certified by the CA to obtain the certificate.

10. The method of claim 9, further comprising sending the certificate to the storage network element for storing the certificate in the storage space.

11. A network functions virtualization (NFV) management and network orchestration (MANO) system comprising:
a memory configured to store instructions;
a processor coupled to the memory and configured to execute the instructions to:
obtain first indication information of a virtualized network function component (VNFC), wherein the first indication information is in an instantiation request message or a virtualized network function component descriptor (VNFCD) of the VNFC, and wherein the first indication information indicates a decision network element for determining a storage network element;
determine, according to a determining result of the decision network element, the storage network element for storing all of a certificate of the VNFC without dividing the certificate, wherein the storage network element is different from the VNFC, and
create a storage space in the storage network element for storing the certificate; and
a transceiver coupled to the processor and configured to send an address of the storage space to the VNFC.

12. The NFV MANO system of claim 11, wherein the processor is further configured to further determine the storage network element before or during a process in which the VNFC applies for the certificate.

13. The NFV MANO system of claim 11, wherein the transceiver is further configured to further send the address in storage and management information of the certificate.

14. The NFV MANO system of claim 11, wherein the first indication information is in the instantiation request message.

15. The NFV MANO system of claim 11, wherein the first indication information is in the VNFCD.

16. The NFV MANO system of claim 11, wherein the processor is further configured to further determine the storage network element according to a management policy.

17. The NFV MANO system of claim 11, wherein the certificate is from a certificate authority (CA) after the VNFC is registered with and certified by the CA.

18. A virtualized network function component (VNFC) comprising:
 a transceiver configured to:
  receive, from a network functions virtualization (NFV) management and orchestration (MANO) system, an address of a storage space, wherein the storage space is for storing all of a certificate of the VNFC without dividing the certificate, wherein the storage space is located in a storage network element, and wherein the storage network element is different from the VNFC; and
  receive a certificate invalidity indication message from a management network element;
 a memory configured to store instructions; and
 a processor coupled to the transceiver and the memory and configured to:
  execute the instructions to access the storage space according to the address to obtain the certificate; and
  delete the address of the storage space or setting the address of the storage space to be invalid according to the certificate invalidity indication message.

19. The VNFC of claim 18, wherein the processor is further configured to:
 register with a certificate authority (CA); and
 attempt to be certified by the CA to obtain the certificate.

20. The VNFC of claim 19, wherein the transceiver is further configured to send the certificate to the storage network element for storing the certificate in the storage space.

* * * * *

UNITED STATES PATENT AND TRADEMARK OFFICE
CERTIFICATE OF CORRECTION

Page 1 of 1

PATENT NO. : 11,070,541 B2
APPLICATION NO. : 15/958465
DATED : July 20, 2021
INVENTOR(S) : Liu et al.

It is certified that error appears in the above-identified patent and that said Letters Patent is hereby corrected as shown below:

On the Title Page

Item (71) Applicant: "Guangdong (CN)" should read "Shenzhen, Guangdong (CN)"

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*